United States Patent Office 3,000,911
Patented Sept. 19, 1961

3,000,911
9α-FLUORO-12β-HYDROXY DERIVATIVES OF THE PREGNANE SERIES
Josef Fried and Josef E. Herz, New Brunswick, N.J., assignors to Olin Mathieson Chemical Corporation, New York, N.Y., a corporation of Virginia
No Drawing. Filed June 28, 1957, Ser. No. 668,612
12 Claims. (Cl. 260—397.3)

This application is a continuation-in-part of our parent applications Serial No. 519,682 and Serial No. 545,795, filed July 1, 1955, and November 8, 1955, respectively.

This invention relates to the synthesis of valuable steroids and has for its objects the provision of: (I) an advantageous process of preparing steroids of the pregnane (including the allopregnane, pregnene and pregnadiene) series having a 9α-fluoro substituent and a 12-keto or 12β-hydroxy substituent; and (II) certain steroids useful themselves as physiologically active steroids or in the preparation of physiologically active steroid derivatives.

The process of this invention essentially comprises: (a) interacting an 11β,12β-epoxy steroid of the pregnane (including the allopregnane, pregnene and pregnadiene) series with hydrogen fluoride to form the corresponding 9α-fluoro-12β-hydroxy derivative; and (b) if desired, oxidizing the 12β-hydroxy steroid, thus formed, to the corresponding 12-keto derivative. If a saturated 11β, 12β-epoxy-pregnane is employed as the starting material and a physiologically active $\Delta^4$-pregnene is desired as the final product, the resultant 9α-fluoro-12β-hydroxy steroid can be brominated to the corresponding 4β-bromo (or 2,4-dibromo) derivative and thence by dehydrobromination to the corresponding $\Delta^4$-pregnene (or a mixture of the corresponding $\Delta^{1,4}$-pregnadiene and $\Delta^{4,6}$-pregnadiene) derivative. The resultant 9α-fluoro-12β-hydroxy-pregnene (or pregnadiene) can then, if desired, be oxidized to the 12-keto derivative.

The compounds of this invention comprise: (A) the intermediate 9α-fluoro-12β-hydroxy (or 12-keto) steroids of the pregnane (including the allopregnane) series; (B) the intermediate 9α-fluoro-4β-bromo-12β-hydroxy steroids of the pregnane series; (C) the intermediate 9α-fluoro-2,4-dibromo-12β-hydroxy steroids of the pregnane (including the allopregnane) series; and (D) the physiologically active 9α-fluoro-12β-hydroxy (or 12-keto)-$\Delta^4$-steroids of the pregnene (including the $\Delta^{1,4}$ and $\Delta^{4,6}$-pregnadiene) series.

For a clearer understanding of the foregoing general and following detailed description of the processes of this invention, reference is made to the following schematic analysis:

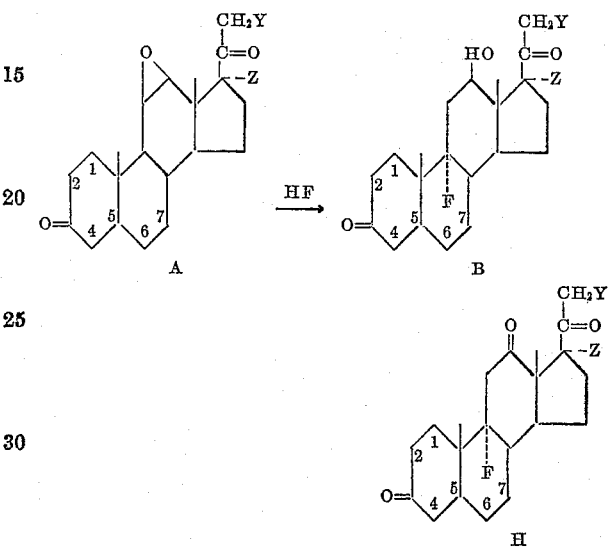

wherein the 1,2; 4,5; and 6,7-positions are saturated or double-bonded; Y is hydrogen, hydroxy or acyloxy, and Z is hydrogen or α-hydroxy.

If Compound B is a saturated steroid, then the following sequence of steps can be employed to convert it to a $\Delta^4$-derivative:

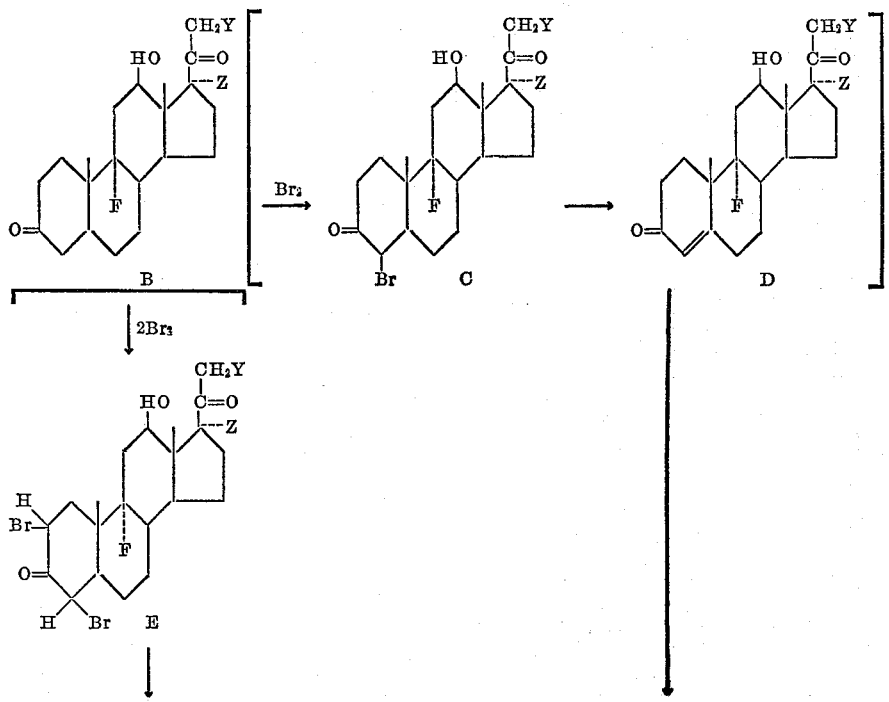

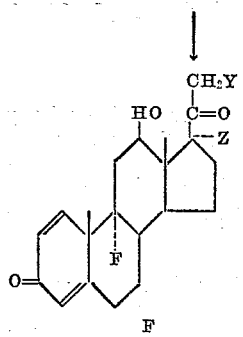

F

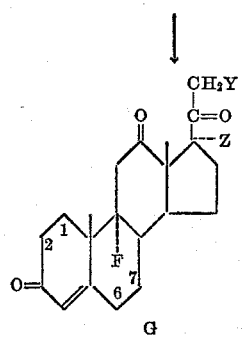

G and

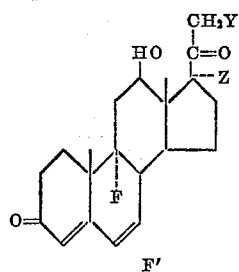

F' wherein the 1,2; and 6,7-positions are double-bonded or saturated, and wherein Y and Z are as hereinbefore defined.

Compounds suitable as initial reactants (Compounds A) in the process of this invention are disclosed in said applications, Serial No. 519,682 and Serial No. 545,795, and include preferably 11β,12β-epoxypregnane-3,20-dione and 11β,12β-epoxy-Δ⁴-pregnene-3,20-dione, although other starting materials may also be used, such as 11β,12β-epoxypregnane-17α-ol-3,20-dione, 11β,12β-epoxypregnane-17α,21-diol-3,20-dione and esters thereof [particularly carboxylic acid esters such as hydrocarbon carboxylic acid esters having less than ten carbon atoms in the acid moiety, as exemplified by the lower alkanoic acid esters (e.g., the acetate, propionate, butyrate and enanthate), the monocyclic hydrocarbon aromatic carboxylic acid esters (e.g., the benzoate), the monocyclic hydrocarbon aralkanoic acid esters (e.g., the phenacetate), the lower alkenoic acid esters, the cycloalkane carboxylic acid esters, and the cycloalkene carboxylic acid esters], 11β,12β-epoxy-Δ⁴-pregnene-17α-ol-3,20-dione, 11β,12β-epoxy-Δ⁴-pregnene-17α,21-diol-3,20-dione and esters thereof, 11β,12β-epoxy-Δ¹,⁴-pregnadiene-3,20-dione, 11β,12β - epoxy - Δ¹,⁴- pregnadiene - 17α -ol - 3,20 - dione, 11β,12β - epoxy - Δ¹,⁴ - pregnadiene - 17α,21 - diol - 3,20-dione and esters thereof, 11β,12β-epoxy-Δ⁴,⁶-pregnadiene-3,20-dione, 11β,12β-epoxy-Δ⁴,⁶-pregnadiene-17α-ol-3,20-dione, and 11β,12β-epoxy-Δ⁴,⁶-pregnadiene-17α,21-diol-3,20-dione and esters thereof.

These compounds are interacted with hydrogen fluoride to yield, inter alia, Compounds B, the corresponding 9α-fluoro-12β-hydroxy derivatives. The reaction is preferably conducted in an organic solvent for the steroid reactant in the cold (e.g., at a temperature of 0° C. or below). The reaction usually results in a mixture of the desired 9α-fluoro-12β-hydroxy steroid derivative and the 12α-fluoro-11β-hydroxy derivative, which can then be separated in the usual manner, as by fractional crystallization.

Compounds B can then be oxidized, if desired, as by treatment with a hexavalent chromium compound (e.g., chromic acid) to yield the corresponding 9α-fluoro-12-keto derivative (Compounds H).

If the initial reactant, Compound A, is saturated in the 1,2; 4,5; and 6,7 positions, the resulting Compound B will also be saturated and hence physiologically inactive. To convert this product to a physiologically active steroid, a double-bond must be introduced into at least the 4,5-position. This may be done by: (1) reacting Compound B, wherein the steroid nucleus is saturated and of the pregnane configuration, with approximately one mole of bromine per mole of steroid, thereby forming Compound C containing a 4β-bromo substituent, and dehydrobrominating as by treatment with an alkali metal halide (such as an alkali metal chloride, as exemplified by lithium chloride) or with a hydrazine derivative (e.g., dinitrophenylhydrazine or semicarbazide) to form the corresponding hydrazone or semicarbazone, followed by decomposition of the latter with a keto acid (e.g., pyruvic acid) to yield a Δ⁴-pregnene, Compound D, which corresponds to Compound B except for the unsaturation in the 4,5-position; or (2) reacting Compound B, wherein the steroid nucleus is saturated and may be either of the pregnane or allopregnane configuration, with two moles of bromine per mole of steroid, thereby forming Compound E containing a 2,4-dibromo substituent (2α,4α if Compound B is an allopregnane and 2β4β- if Compound B is a pregnane), and dehydrobrominating by treatment with an organic base such as pyridine or collidine, to prepare a mixture (which is separable by chromatography) of a Δ¹,⁴-pregnadiene, Compounds F, and a Δ⁴,⁶-pregnadiene, Compounds F'. These derivatives correspond to Compounds B wherein the 4,5-position and one of the positions 1,2 and 6,7 is double-bonded.

Compounds D, F, and F' can also be oxidized, if desired, to the corresponding 12-keto derivatives, Compounds G, by treatment with an oxidizing agent such as a hexavalent chromium compound (e.g., chromic acid).

The new 9α-fluoro-12β-hydroxy (or 12-keto)-Δ⁴-pregnene (including the pregnadiene) steroids of this invention (Compounds D, F, F', and G) and particularly those of the general formula

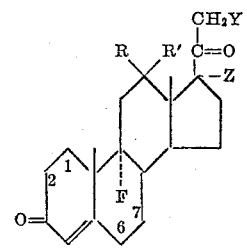

wherein the 1,2- and 6,7-positions are saturated or double-bonded; Y and Z are as hereinbefore defined; and individually R is hydrogen, R' is β-hydroxy or β-acyloxy (particularly the acyloxy radical of a hydrocarbon carboxylic acid having less than ten carbon atoms; these ester derivatives being prepared by interaction of the free 12β-hydroxy steroid with the desired acyl halide or acid anhydride in the usual manner) and together R and R' represent keto (oxo), are physiologically active steroids which possess progestational activity. Thus, the new steroids of this invention can be administered instead of, and in the same manner as, progesterone, in the treatment of habitual abortion. The dosage for such administration is, of course, dependent on the relative activity of the compound. The 9α-fluoro-12-keto steroids of the saturated pregnane series of this invention are further useful as intermediates in the preparation of the corresponding known Δ9(11)-12-keto derivatives, which in turn by monobromination and dehydrobromination, as described hereinbefore, can be converted to the active Δ4,9(11)-12-keto-pregnadiene derivatives.

For the purpose of illustrating the preferred process of this invention, reference is made to the following schematic analysis employing 11β,12β-epoxypregnane-3,20-dione and 11β,12β-epoxyprogesterone as starting materials:

with water, dried over sodium sulfate and the solvent removed in vacuo. The residue crystallizes readily from acetone-hexane and yields pure 12α-fluoro-11β-hydroxyprogesterone.

From the acetone-hexane mother liquor is isolated a second substance, identified as 9α-fluoro-12β-hydroxyprogesterone, which after recrystallization from acetone-hexane has the following properties: double M.P. at about 194–195° and 220–222°; $[\alpha]_D^{23}$ +85° (c. 1.33 in chloroform);

$\lambda_{max.}^{alc.}$ 236mµ ($\varepsilon$=17,000); $\lambda_{max.}^{Nujol}$ 2.93µ, 5.87µ, 6.05µ, and 6.19µ

*Analysis.*—Calcd. for $C_{21}H_{29}O_3F$ (348.44): C, 72.29; H, 8.39; F, 5.45. Found: C, 72.56; H, 8.34; F, 5.50.

In a similar manner by substituting 11β,12β-epoxy-Δ1,4-pregnadiene-3,20-dione and 11β,12β-epoxy-Δ4,6-pregnadiene-3,20-dione for the 11β,12β-epoxyprogesterone in the procedure of Example 1, there is obtained 9α-fluoro-Δ1,4-pregnadiene-12β-ol-3,20-dione and 9α-fluoro-Δ4,6-pregnadiene-12β-ol-3,20-dione, respectively. Furthermore, upon substitution of 11β,12β-epoxy-Δ4-preg-

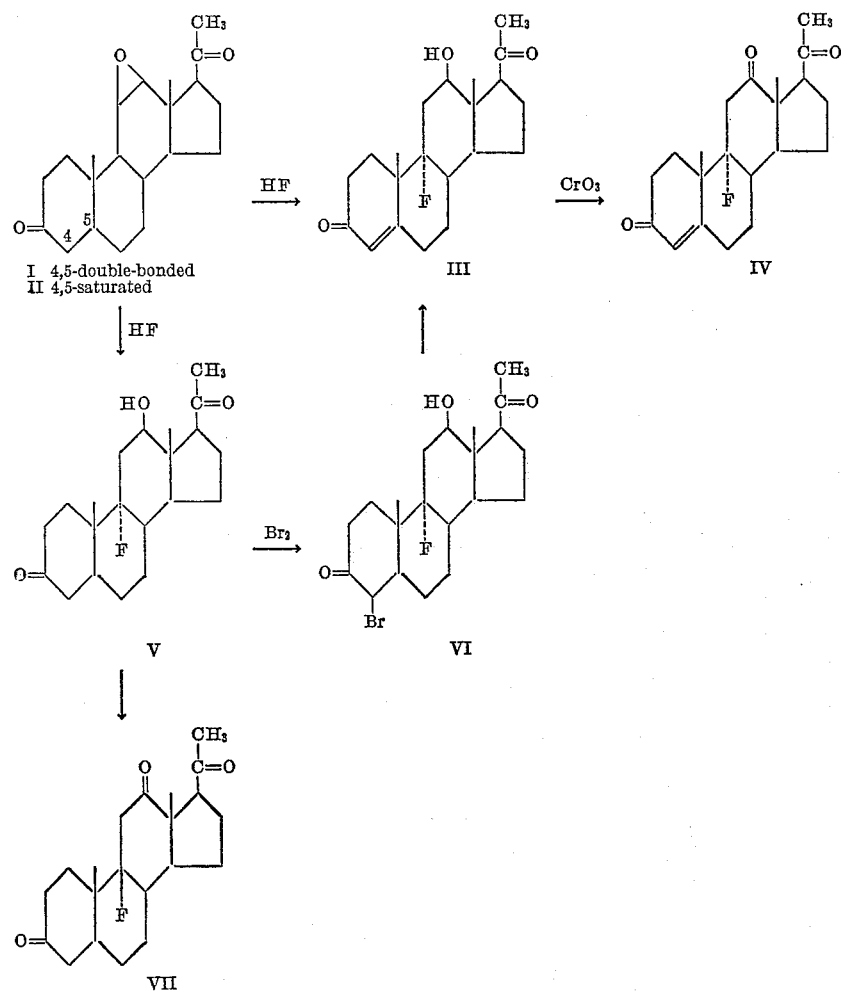

I 4,5-double-bonded
II 4,5-saturated

The following examples are illustrative of the invention (all temperatures being in centigrade):

EXAMPLE 1

*9α-fluoro-12β-hydroxyprogesterone (III)*

To a solution of 100 mg. of 11β,12β-epoxyprogesterone (I) in 19 ml. of chloroform and 1 ml. of absolute alcohol is added at 0°, with the exclusion of moisture, hydrogen fluoride until the solution assumes a permanent raspberry-red color. After stirring for 1.5 hours at 0°, the mixture is neutralized with a suspension of sodium bicarbonate. The chloroform layer is washed nene-17α-ol-3,20-dione and 11β,12β-epoxy-Δ4-pregnene-17α,21-diol-3,20-dione 21-acetate for 11β,12β-epoxyprogesterone in the procedure of Example 1, 9α-fluoro-Δ4-pregnene-12β,17α-diol-3,20-dione and 9α-fluoro-Δ4-pregnene-12β,17α,21-triol-3,20-dione 21-acetate are formed, respectively.

EXAMPLE 2

*9α-fluoro-12-ketoprogesterone (IV)*

To a solution of 20 mg. of 9α-fluoro-12β-hydroxyprogesterone in 2 ml. of reagent grade acetone is added with stirring 0.42 ml. of a solution containing 200 mg.

of chromium trioxide and 320 mg. of sulfuric acid in 10 ml. of 90% aqueous acetone. The mixture is allowed to remain at room temperature for 20 minutes and the excess chromic acid is reduced by the addition of a few drops of alcohol. Water is added and the mixture extracted with chloroform. The chloroform extract is washed with water, dried over sodium sulfate anl the solvent removed in vacuo. The residual crystals on recrystallization from acetone-hexane gives pure 9α-fluoro-12-ketoprogesterone of the following properties: M.P. about 224–225°; $[\alpha]_D^{23}$ +186° (c. 0.49 in chloroform); $\lambda_{max.}^{alc.}$ 235mμ (ε=17,100); $\lambda_{max.}^{Nujol}$ 5.81μ, 5.85μ, 6.01μ, 6.20μ

*Analysis.*—Calcd. for $C_{21}H_{27}O_3F$ (346.42): C, 72.81; H, 7.85. Found: C, 72.77; H, 7.81.

In a similar manner, all other 9α-fluoro-12β-hydroxy steroids can be oxidized to their corresponding 9α-fluoro-12-keto derivatives by following the procedure of Example 2.

EXAMPLE 3

*9α-fluoro-12β-hydroxypregnane-3,20-dione (V)*

To a solution of 250 mg. of 11β,12β-epoxypregnane-3,20-dione (II) in 24 ml. of chloroform and 1.25 ml. of ethanol is added at 0° with stirring hydrogen fluoride until two layers become definitely discernible. The mixture is stirred for a total of one hour and 25 minutes at 0° and is then neutralized by the addition of an aqueous suspension of sodium bicarbonate. The chloroform layer is washed with water, dried over sodium sulfate and evaporated to dryness in vacuo. The residue on crystallization from acetone-hexane furnishes about 94 mg. of 9α-fluoropregnate-12β-ol-3,20-dione having the following properties: M.P. about 187–189°; $[\alpha]_D^{23}$ —4° (c. 0.96 in chloroform);

$\lambda_{max.}^{Nujol}$ 293μ (OH), 5.86μ (3-keto), 5.92μ (20-keto); $\lambda_{max.}^{alc.}$ No specific absorption

*Analysis.*—Calcd. for $C_{21}H_{31}O_3F$ (350.42): C, 71.98; H, 8.90; F, 5.43. Found: C, 72.01; H, 8.98; F, 5.50.

EXAMPLE 4

*9α-fluoro-12β-hydroxypregnane-3,20-dione (V)*

To a mixture of 1 ml. of methanol and 1.5 ml. of liquid hydrogen fluoride is added at —76°, 75 mg. of 11β,12β-epoxypregnane-3,20 - dione (II). The resulting solution is allowed to warm up slowly to 0° and at that point another 1 ml. of hydrogen fluoride is added. The mixture is then kept at room temperature for 5 hours during which time it assumes a deep red color. Chloroform is added, the resulting solution is immersed in an ice-bath and the hydrogen fluoride neutralized by the addition of a suspension of sodium bicarbonate in water. Extraction of the chloroform solution with water gives after drying over sodium sulfate and evaporation of the solvent in vacuo about 84 mg. of an amorphous residue. The latter is chromatographed on 2 g. of sulfuric acid washed alumina and the column eluted with 200 ml. of benzene-hexane 1:1, 300 ml. of benzene-hexane 3:1, and 250 ml. of benzene. The last two eluants furnish 9α-fluoro-12β-hydroxypregnane-3,20-dione, identical to the product obtained in Example 3.

Similarly, by following the procedure of either Example 3 or 4, 11β,12β-epoxypregnane-17α-ol-3,20-dione and 11β,12β-epoxypregnane-17α,21-diol-3,20-dione yield 9α-fluoropregnane-12β,17α-diol-3,20-dione and 9α-fluoro-12β,17α,21-triol-3,20-dione, respectively.

EXAMPLE 5

*9α-fluoro-4β-bromo-12β-hydroxypregnane-3,20-dione (VI)*

To a solution of 50 mg. of 9α-fluoro-12β-hydroxypregnane-3,20-dione in 10 ml. of glacial acetic acid is added a drop of 10% hydrogen bromide in acetic acid and then dropwise a solution of 25 mg. of bromine in 1 ml. of glacial acetic acid. After addition of 30 mg. of solid sodium acetate, the solvent is removed in vacuo and the residue taken up in chloroform. The resulting chloroform solution is washed with dilute sodium bicarbonate and water and after drying over sodium sulfate evaporated to dryness to yield essentially pure 9α-fluoro-4β-bromo-12β-hydroxypregnane-3,20-dione.

Similarly, 9α - fluoropregnane-12β,17α-diol-3,20-dione and 9α-fluoropregnane-12β,17α,21-triol-3,20 - dione can be converted to 9α-fluoro-4β-bromo-12β,17α-diol-3,20-dione and 9α-fluoro-4β-bromopregnane-12β,17α,21-triol-3,20-dione, respectively.

EXAMPLE 6

*9α-fluoro-12β-hydroxyprogesterone (III)*

A solution of 73 mg. of 9α-fluoro-4β-12β-hydroxypregnane-3,20-dione and 135 mg. of anhydrous lithium chloride in 5 ml. of redistilled dimethylformamide is heated at 100° under nitrogen for two and one-half hours. The solution is then diluted with chloroform and extracted with water, dilute sodium bicarbonate solution and again with water. After drying over sodium sulfate the solvent is evaporated in vacuo leaving a crystalline residue of essentially pure 9α-fluoro-12β-hydroxyprogesterone, identical with the product formed in Example 1.

Similarly, 9α - fluoro-4β-bromopregnane-12β,17α-diol-3,20-dione and 9α-fluoro-4β-bromopregnane-12β,17α,21-triol-3,20-dione can be converted to 9α-fluoro-Δ⁴-pregnene-12β,17α-diol-3,20-dione and 9α-fluoro-Δ⁴-pregnene-12β,17α,21-triol-3,20-dione, respectively, by the procedure of Example 6.

EXAMPLE 7

*9α-fluoropregnane-3,12,20-trione (VII)*

To a solution of 18 mg. of 9α-fluoropregnane-12β-ol-3,20-dione in 2 ml. of acetone is added with stirring 0.3 ml. of a solution prepared by mixing a solution of 200 mg. of chromium trioxide and 320 mg. of sulfuric acid in 1 ml. of water with 9 ml. of acetone. After 15 minutes a few drops of alcohol are added and the mixture is partitioned between chloroform and water. The chloroform solution is washed with water, dilute sodium bicarbonate and water, dried over sodium sulfate and evaporated to dryness in vacuo. The residue upon crystallization from acetone furnishes 9α-fluoropregnane-3,12,20-trione of the following properties: M.P. about 224–225°; $[\alpha]_D$+135° (c. 0.54 in chloroform);

$\lambda_{max.}^{Nujol}$ 5.84μ

*Analysis.*—Calcd. for $C_{21}H_{29}O_3F$ (348.41): C, 72.39; H, 8.39. Found: C, 72.63; H, 8.25.

Similarly, 9α - fluoropregnane - 12β,17α - diol - 3,20-dione and 9α-fluoropregnane-12β,17α,21-triol-3,20-dione 21-acetate can be oxidized to 9α-fluoropregnane-17α-ol-3,12,20-trione and 9α-fluoropregnane-17α,21-diol-3,12,20-trione 21-acetate, respectively.

EXAMPLE 8

*9α-fluoropregnane-12β-ol-3,20-dione 12-tosylate*

A solution of 169 mg. of 9α-fluoropregnane-12β-ol-3,20-dione and 347 mg. of pure p-toluenesulfonyl chloride in 4.5 ml. of anhydrous pyridine is allowed to stand at 45° for 72 hours. At the end of this period ice is added and the mixture extracted with chloroform. The chloroform solution is washed with dilute sulfuric acid, water, dilute sodium bicarbonate and again with water, dried over sodium sulfate and the solvent removed in vacuo. The crystalline residue after recrystallization from 95% alcohol has the following properties: M.P. about 161–162° (dec.); $[\alpha]_D^{23}$+84° (c. 1.18 in chloroform);

$\lambda_{max.}^{alc.}$ 226mμ (ε=13,100); $\lambda_{max.}^{Nujol}$ 5.84μ, 6.26μ

*Analysis.*—Calcd. for $C_{28}H_{37}O_5SF$ (504.63): C, 66.63; H, 7.39. Found: C, 66.87; H, 7.25.

Similarly, if another acylating agent such as acetic anhydride is substituted for the p-toluenesulfonyl chloride in the procedure of Example 8, the corresponding 12-ester is formed (e.g., 9α-fluoropregnane-12β-ol-3,20-dione 12-acetate). Furthermore, the process of Example 8 is of general applicability and may be used to esterify all of the free 12β-hydroxy steroids of this invention to their corresponding 12-ester derivatives. Thus, 9α-fluoro-12β-hydroxyprogesterone upon treatment with acetic anhydride according to the process of Example 8 yields 9α-fluoro-12β-hydroxyprogesterone 12-acetate.

The 9α-fluoro-12-keto saturated pregnane steroids of this invention can be converted to the corresponding $\Delta^{9(11)}$-steroid derivatives as illustrated by the following example.

EXAMPLE 9

$\Delta^{9(11)}$-pregnane-3,12,20-trione

A suspension of 5 mg. of 9α-fluoropregnane-3,12,20-trione in 3 ml. of 0.261 N KOH in methanol is shaken at room temperature for 5 minutes, during which time all of the steroid has dissolved. Water is added and the mixture is neutralized with acetic acid. Extraction with chloroform followed by a water wash of the chloroform extract, drying over sodium sulfate and evaporation of the solvent in vacuo gives a crystalline residue, which on recrystallization from acetone-hexane has the following properties: M.P. about 183–184°;

$\lambda_{max}^{alc.}$. 236mµ (ε=13,000) ;λ $_{max.}^{Nujol}$ 5.80µ, 5.86µ, 5.98µ, 6.24µ reported [P. Hegner and T. Reichstein, Helv. chim. Acta 26, 721 (1943)] M.P. 184–186°.

These $\Delta^{9(11)}$-pregnene steroids can in turn be converted to the corresponding $\Delta^{4,9(11)}$-pregnadiene derivatives by following the successive procedures of Examples 5 and 6, but substituting a $\Delta^{9(11)}$-steroid (e.g., $\Delta^{9(11)}$-pregnene-3,12,20-trione) for the 9α-fluoropregnane-12β-ol-3,20-dione reactant in Example 5.

The invention may be otherwise variously embodied within the scope of the appended claims.

What is claimed is:

1. A compound selected from the group consisting of steroids of the general formulae

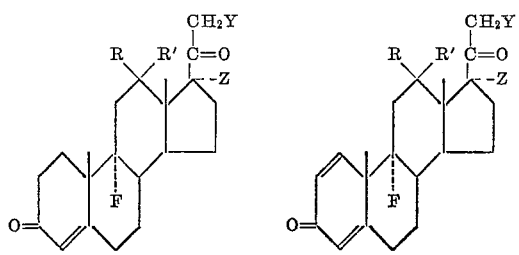

and

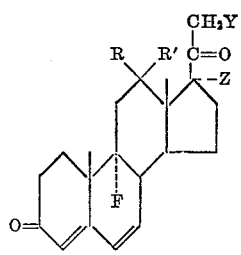

wherein individually R is hydrogen, R' is selected from the group consisting of β-hydroxy and β-acyloxy, and together R and R' is keto, Y is selected from the group consisting of hydrogen, hydroxy and acyloxy, and Z is selected from the group consisting of hydrogen and α-hydroxy.

2. 9α-fluoropregnane-12β-ol-3,20-dione.
3. 9α-fluoropregnane-3,12,20-trione.
4. 9α-fluoro-12β-hydroxyprogesterone.
5. 9α-fluoro-12-ketoprogesterone.
6. A steroid of the general formula

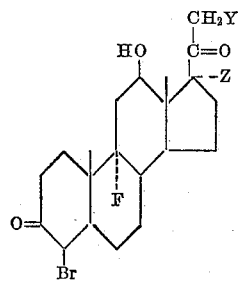

wherein Y is selected from the group consisting of hydrogen, hydroxy and acyloxy, and Z is selected from the group consisting of hydrogen and α-hydroxy.

7. 9α-fluoro-4β-bromopregnane-12β-ol-3,20-dione.
8. A process for preparing a compound selected from the group consisting of steroids of the general formulae;

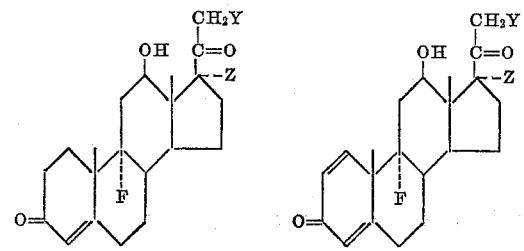

and

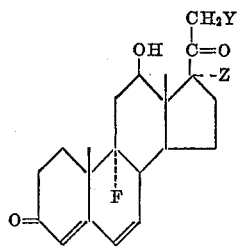

wherein Y is selected from the group consisting of hydrogen, hydroxy and acyloxy, and Z is selected from the group consisting of hydrogen and α-hydroxy, which comprises interacting a compound selected from the group consisting of steroids of the general formulae;

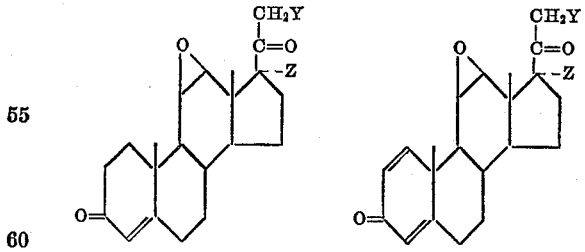

and

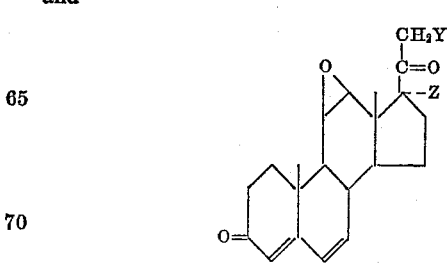

wherein Y and Z are as above defined, with hydrogen fluoride and recovering the 9α-fluoro-12β-hydroxy steroid formed.

9. A steroid of the general formula

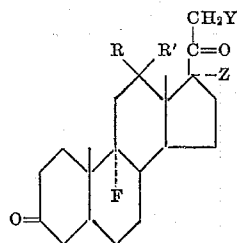

wherein individually R is hydrogen, R' is selected from the group consisting of β-hydroxy and β-acyloxy, and together R and R' is keto, Y is selected from the group consisting of hydrogen, hydroxy and acyloxy, and Z is selected from the group consisting of hydrogen and α-hydroxy.

10. A process for preparing a steroid of the general formula

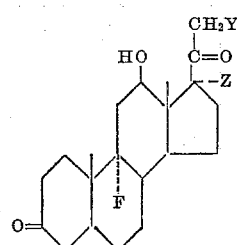

wherein Y is selected from the group consisting of hydrogen, hydroxy and acyloxy, and Z is selected from the group consisting of hydrogen and α-hydroxy, which comprises interacting a steroid of the general formula

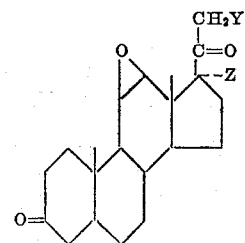

wherein Y and Z are as above defined, with hydrogen fluoride and recovering the 9α-fluoro-12β-hydroxy steroid formed.

11. A process for preparing 9α-fluoropregnane-12β-ol-3,20-dione, which comprises interacting 11β,12β-epoxypregnane-3,20-dione with hydrogen fluoride and recovering the 9α-fluoro-12β-hydroxy steroid formed.

12. A process for preparing 9α-fluoro-12β-hydroxyprogesterone, which comprises interacting 11β,12β-epoxyprogesterone with hydrogen fluoride and recovering the 9α-fluoro-12β-hydroxy steroid formed.

References Cited in the file of this patent

UNITED STATES PATENTS

| | | |
|---|---|---|
| 2,773,076 | Reichstein | Dec. 4, 1956 |
| 2,789,117 | Sarett | Apr. 16, 1957 |

UNITED STATES PATENT OFFICE
CERTIFICATE OF CORRECTION

Patent No. 3,000,911                        September 19, 1961

Josef Fried et al.

It is hereby certified that error appears in the above numbered patent requiring correction and that the said Letters Patent should read as corrected below.

Column 2, lines 25 to 34, to the left of formula H, the following should be inserted:

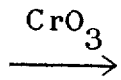

column 8, line 16, for "9α-fluoro-4β-12β-hydroxy-" read -- 9α-fluoro-4β-bromo-12β-hydroxy- --; line 61, for "169 mg. of 9α-fluoropregnane-128-01-" read -- 160 mg. of 9α-fluoropregnane-12β-ol- --.

Signed and sealed this 6th day of March 1962.

(SEAL)
Attest:

ERNEST W. SWIDER
Attesting Officer

DAVID L. LADD
Commissioner of Patents